United States Patent
Hirokawa

(10) Patent No.: US 12,387,471 B2
(45) Date of Patent: Aug. 12, 2025

(54) MODEL GENERATION APPARATUS, MODEL GENERATION METHOD, IMAGE PROCESSING APPARATUS, IMAGE PROCESSING METHOD, AND RECORDING MEDIUM

(71) Applicant: NEC Corporation, Tokyo (JP)

(72) Inventor: Akira Hirokawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 383 days.

(21) Appl. No.: 17/912,110

(22) PCT Filed: Mar. 30, 2020

(86) PCT No.: PCT/JP2020/014515
§ 371 (c)(1),
(2) Date: Sep. 16, 2022

(87) PCT Pub. No.: WO2021/199142
PCT Pub. Date: Oct. 7, 2021

(65) Prior Publication Data
US 2023/0139211 A1    May 4, 2023

(51) Int. Cl.
G06V 10/771    (2022.01)
G06V 10/776    (2022.01)
G06V 40/12    (2022.01)

(52) U.S. Cl.
CPC .......... *G06V 10/776* (2022.01); *G06V 10/771* (2022.01); *G06V 40/12* (2022.01)

(58) Field of Classification Search
CPC ..... G06V 10/776; G06V 10/771; G06V 40/12
See application file for complete search history.

(56) References Cited

U.S. PATENT DOCUMENTS

| | | | |
|---|---|---|---|
| 2016/0055367 A1 | 2/2016 | Hara | |
| 2019/0102700 A1* | 4/2019 | Babu | G06N 20/00 |
| 2019/0362130 A1 | 11/2019 | Othman et al. | |
| 2022/0043895 A1* | 2/2022 | Nakazaki | G06V 40/45 |

(Continued)

FOREIGN PATENT DOCUMENTS

| | | | |
|---|---|---|---|
| JP | 2016-045501 A | 4/2016 | |
| JP | 2018-165911 A | 10/2018 | |
| JP | 2019-191913 A | 10/2019 | |

OTHER PUBLICATIONS

Joshi, Indu, et al. "Latent fingerprint enhancement using generative adversarial networks." IEEE, Jan. 2019 (Year: 2019).*

(Continued)

*Primary Examiner* — Oneal R Mistry
*Assistant Examiner* — Nhut Huy Pham

(57) ABSTRACT

In a model generation apparatus, a training data selection means selects sets of training data from a plurality of fingerprint images. A learning means trains a model that corrects a fingerprint image, by using the sets of training data. An evaluation value calculation means calculates evaluation values of results acquired by inputting the plurality of fingerprint images into the trained model. A model update means updates a model to be trained, based on the evaluation values. Next, the training data selection means determines sets of training data to be selected from the plurality of fingerprint images based on the evaluation values.

8 Claims, 9 Drawing Sheets

(56) References Cited

U.S. PATENT DOCUMENTS

2022/0319154 A1  10/2022  Zhang et al.

OTHER PUBLICATIONS

Joshi, Indu, et al. "Latent fingerprint enhancement using generative adversarial networks." IEEE, 2019. (Year: 2019)*
JP Office Action for JP Application No. 2022-512890 , mailed on Aug. 1, 2023 with English Translation.
Indu Joshi et al., "Latent Fingerprint Enhancement Using Generative Adversarial Networks" and 2019 IEEE Winter Conference on Applications of Computer Vision (WACV), The U.S., IEEE, Jan. 7, 2019, pp. 895-903.
Li Wang et al., "Fingerprint Reference Point Detection Based on Local Ridge Orientation Patterns of Fingerprints" and The 2012 International Joint Conference on Neural Networks (IJCNN), The U.S., IEEE, Jun. 10, 2012, pp. 1-8.
International Search Report for PCT Application No. PCT/JP2020/014515, mailed on Jun. 23, 2020.
US Office Action for U.S. Appl. No. 18/382,574, mailed on Apr. 7, 2025.
US Office Action for U.S. Appl. No. 18/382,577, mailed on Apr. 7, 2025.

* cited by examiner

MODEL GENERATION APPARATUS, MODEL GENERATION METHOD, IMAGE PROCESSING APPARATUS, IMAGE PROCESSING METHOD, AND RECORDING MEDIUM

This application is a National Stage Entry of PCT/JP2020/014515 filed on Mar. 30, 2020, the contents of all of which are incorporated herein by reference, in their entirety.

TECHNICAL FIELD

The present disclosure relates to processing of a fingerprint image.

BACKGROUND ART

A fingerprint authentication is known as one method of biometric authentication. In the fingerprint authentication, a fingerprint image of a specific person and data of feature points extracted from a fingerprint image are stored in a fingerprint database. In a case of matching fingerprints, feature points are extracted from a target fingerprint image and compared with feature points of each of fingerprints registered in the fingerprint database, and it is determined whether or not a subject person matches the specific person. Patent Document 1 describes a technique for classifying regions in a fingerprint image using a model trained by machine learning.

PRECEDING TECHNICAL REFERENCES

Patent Document

Patent Document 1: Japanese Laid-open Patent Publication No. 2018-165911

SUMMARY

Problem to be Solved by the Invention

Each fingerprint image obtained by a scanner or the like is not stored as an original in a fingerprint database for a crime investigation or the like, but the fingerprint image is registered after a forensic examiner corrects skeleton lines as necessary. However, since it is difficult for the forensic examiner to correct all of a large number of fingerprint images, it is desirable that an apparatus can automatically correct a fingerprint image with accuracy close to that of the forensic examiner.

In addition, as described above, the fingerprint image that has been corrected by the forensic examiner is registered in the fingerprint database in principle. However, for various reasons, fingerprint images (hereinafter referred to as "uncorrected images") that have not been corrected by the forensic examiner may be registered in the fingerprint database. Since such uncorrected fingerprints are not suitable for matching of fingerprints, it is necessary to increase reliability of the fingerprint images registered in the fingerprint database by finding and correcting the uncorrected images.

It is one object of the present disclosure to generate a model for correcting skeleton lines of each of fingerprint images registered in the fingerprint database with high accuracy, and to detect a corrected image using a model.

Means for Solving the Problem

According to an example aspect of the present disclosure, there is provided a model generation apparatus including:

a training data selection means configured to select sets of training data from a plurality of fingerprint images;

a learning means configured to train a model that corrects a fingerprint image, by using the sets of training data;

an evaluation value calculation means configured to calculate evaluation values of results acquired by inputting the plurality of fingerprint images to the model which has been trained; and a model update means configured to update the model to be trained based on the evaluation values, wherein the training data selection means determines the sets of training data to be selected from the plurality of fingerprint images, based on the evaluation values.

According to another example aspect of the present disclosure, there is provided a model generation method including:

selecting sets of training data from a plurality of fingerprint images;

training a model that corrects a fingerprint image, by using the sets of training data;

calculating evaluation values of results acquired by inputting the plurality of fingerprint images to the model which has been trained; and updating the model to be trained based on the evaluation values, wherein the sets of training data to be selected from the plurality of fingerprint images are determined based on the evaluation values.

According to a still another example aspect of the present disclosure, there is provided a recording medium storing a program, the program causing a computer to perform a process including:

selecting sets of training data from a plurality of fingerprint images;

training a model that corrects a fingerprint image, by using the sets of training data;

calculating evaluation values of results acquired by inputting the plurality of fingerprint images to the model which has been trained; and updating the model to be trained based on the evaluation values, wherein the sets of training data to be selected from the plurality of fingerprint images are determined based on the evaluation values.

According to further example aspect of the present disclosure, there is provided an image processing apparatus including:

a model generation means configured to select sets of training data from a plurality of fingerprint images including an uncorrected image, generate a model that corrects a fingerprint image by the selected sets of training data, and generate a final model by repeating a process for selecting sets of training data for a next model by using the generated model; and an uncorrected image detection means configured to detect the uncorrected image included in the plurality of fingerprint images by using evaluation values of results acquired from the final model.

According to still further example aspect of the present disclosure, there is provided an image processing method including:

selecting sets of training data from a plurality of fingerprint images including an uncorrected image, generating a model that corrects a fingerprint image by the selected sets of training data, and generating a final model by repeating a process for selecting sets of training data for a next model by using the generated model; and detecting the uncorrected image included in the plurality of fingerprint images by using evaluation values of results acquired from the final model.

According to a yet further example aspect of the present disclosure, there is provided a recording medium storing a program, the program causing a computer to perform a process including:

selecting sets of training data from a plurality of fingerprint images including an uncorrected image, generating a model that corrects a fingerprint image by the selected sets of training data, and generating a final model by repeating a process for selecting sets of training data for a next model by using the generated model; and detecting the uncorrected image included in the plurality of fingerprint images by using evaluation values of results acquired from the final model.

Effect of the Invention

According to the present disclosure, it becomes possible to generate a model for extracting skeleton lines with high accuracy from each of fingerprint images registered in a fingerprint database and detect each uncorrected image using a mode.

EXAMPLE EMBODIMENTS

In the following, example embodiments will be described with reference to the accompanying drawings.

First Example Embodiment

Skeleton Extraction Model Generation Apparatus

Figure 1:
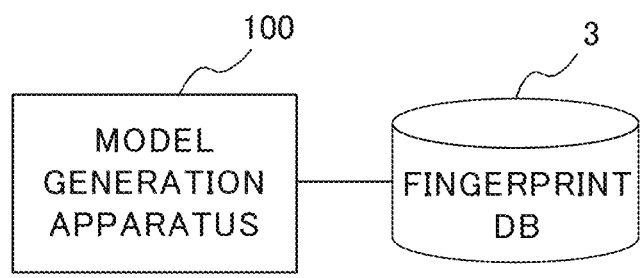
FIG. 1 illustrates an outline of a model generation apparatus according to a first example embodiment.

FIG. 1 illustrates an outline of a model generation apparatus according to a first example embodiment of the present disclosure. A model generation apparatus 100 generates a skeleton extraction model that extracts skeleton lines from a fingerprint image. The skeleton extraction model is regarded as a model, which extracts the skeleton lines from the input fingerprint image and generates a fingerprint image in which the skeleton lines are drawn or corrected, and is generated by machine learning or the like. A "skeleton line" is a ridge in a fingerprint image indicated by a thin line of a constant width. As illustrated, the model generation apparatus 100 is connected to a fingerprint database (hereinafter referred to as "DB") 3. A plurality of fingerprint images registered in the fingerprint DB 3 are input to the model generation apparatus 100. The fingerprint images registered in the fingerprint DB 3 are obtained from each particular person such as a criminal, for instance. For instance, in a criminal investigation, a person is specified by matching a large number of fingerprints registered in a fingerprint DB 3 with each fingerprint collected at a crime scene.

Fingerprint images obtained from a person to be registered using a scanner or the like are not retained as they are, but are registered in the fingerprint DB 3 after necessary correction of skeleton lines is performed by a forensic examiner or the like. However, for various reasons, uncorrected images that have not been corrected may be registered in the fingerprint DB 3. Since the uncorrected fingerprint images are not suitable for matching of fingerprints, it is needed to discover the uncorrected fingerprint images, perform necessary corrections with respect to the uncorrected image, and then re-register the corrected fingerprint image in the DB 3. Therefore, in the present example embodiment, first, the skeleton extraction model for extracting skeleton lines with high accuracy from each fingerprint image is generated, and each corrected image registered in the fingerprint DB 3 is detected using the skeleton extraction model.

Hardware Configuration

Figure 2:
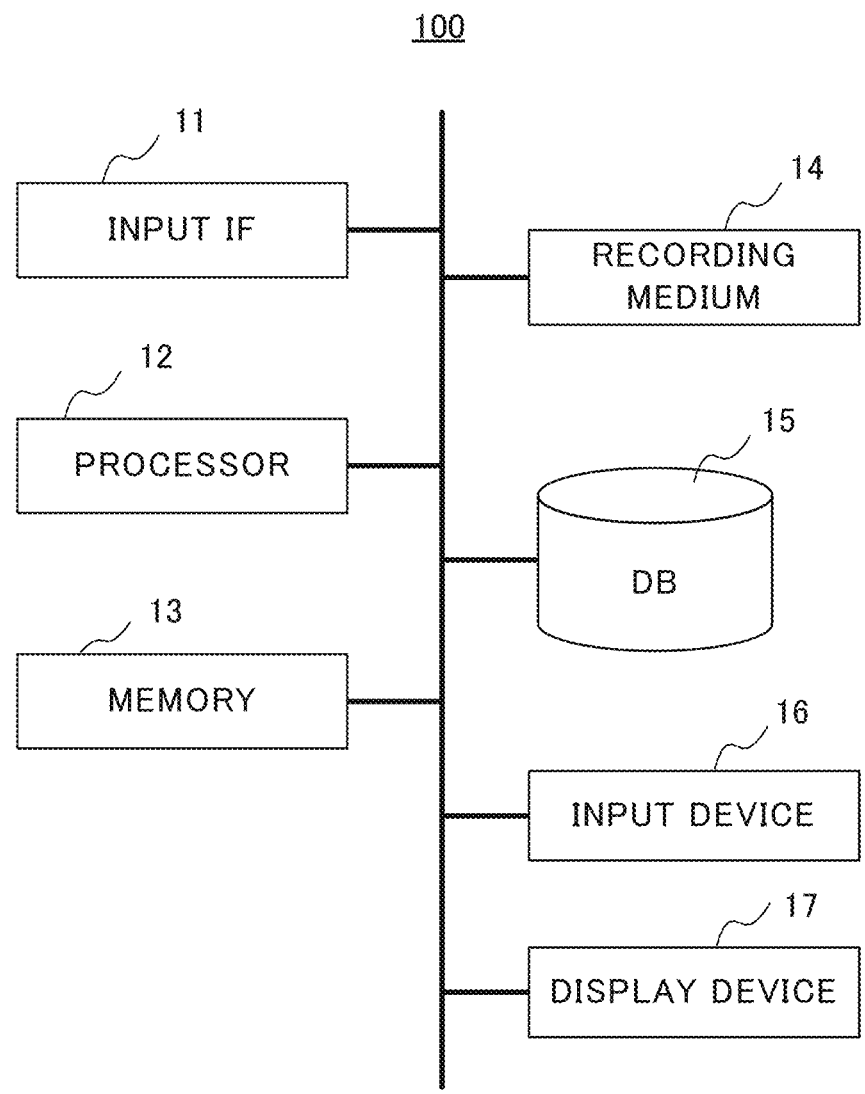
FIG. 2 is a block diagram illustrating a hardware configuration of a model generation apparatus.

FIG. 2 is a block diagram illustrating a hardware configuration of the model generation apparatus 100. As illustrated, the model generation apparatus 100 includes an input IF (InterFace) 11, a processor 12, a memory 13, a recording medium 14, a database (hereinafter, referred to as a "DB") 15, an input device 16, and a display device 17.

The input IF 11 inputs and outputs data. Specifically, the input IF 11 acquires a fingerprint image from the fingerprint DB 3.

The processor 12 is a computer such as a CPU (Central Processing Unit) or a GPU (Graphics Processing Unit), and controls the entire model generation apparatus 100 by executing programs prepared in advance. In particular, the processor 12 performs a model generation process which will be described later.

The memory 13 is formed by a ROM (Read Only Memory), a RAM (Random Access Memory), or the like. The memory 13 stores various programs to be executed by the processor 12. The memory 13 is also used as a working memory during the execution of various processes by the processor 12.

The recording medium 14 is a non-volatile and non-transitory recording medium such as a disk-shaped recording medium, a semiconductor memory, or the like, and is formed to be detachable from the model generation apparatus 100. The recording medium 14 records various programs executed by the processor 12.

The DB 15 stores each fingerprint image input from the input IF 11. The DB 15 also stores the skeleton extraction model generated by the model generation process and a plurality of fingerprint images used during the model generation process.

The input device 16 is, for instance, a keyboard, a mouse, a touch panel, or the like, and is used when the user performs necessary instructions and inputs in connection with processes by the model generation apparatus 100. The display device 17 is, for instance, a liquid crystal display, in accordance with the instruction of the user, and displays a fingerprint image or the like.

Functional Configuration

Figure 3:
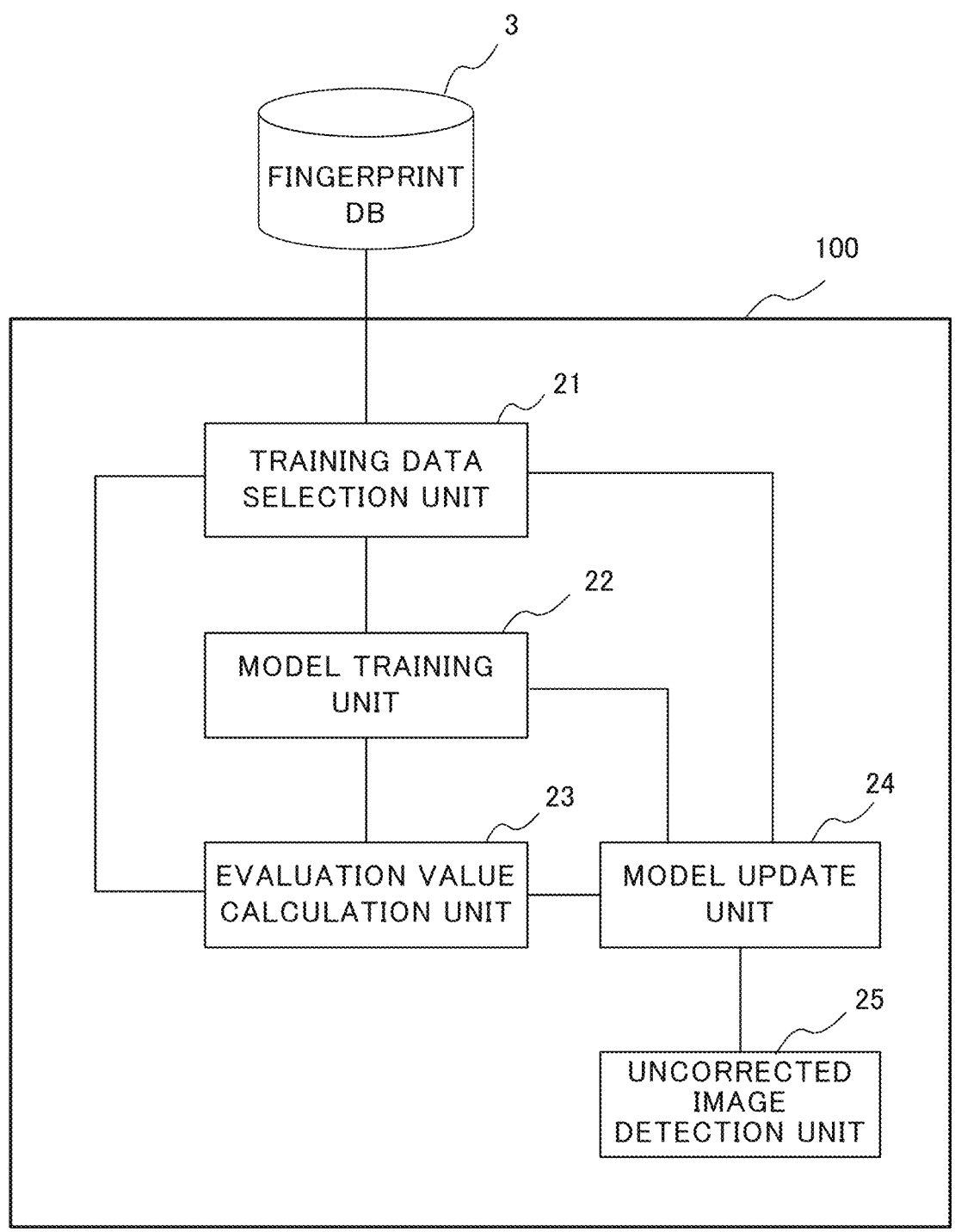
FIG. 3 is a block diagram illustrating a functional configuration of the model generation apparatus.

FIG. 3 is a block diagram illustrating a functional configuration of the model generation apparatus 100. The model generation apparatus 100 includes a training data selection unit 21, a model training unit 22, an evaluation value calculation unit 23, a model update unit 24, and an uncorrected image detection unit 25.

The training data selection unit 21 selects the training data to be used for training the skeleton extraction model from the plurality of fingerprint images stored in the fingerprint DB 3. The training data includes a fingerprint image registered in the fingerprint DB 3 and a fingerprint image (correct answer data) corrected by drawing skeleton lines by the forensic examiner or the like with respect to that registered fingerprint image.

The model training unit 22 trains the skeleton extraction model using the training data selected by the training data selection unit 21. The skeleton extraction model is regarded as a model trained by using the training data. The skeleton extraction model is trained to output correct answer data, that is, a fingerprint image close to a fingerprint image corrected by the forensic examiner or the like. The model training unit 22 corresponds to examples of a learning means and a model generation means.

The evaluation value calculation unit 23 calculates the evaluation value using the skeleton extraction model trained by the model training unit 22. Specifically, the evaluation value calculation unit 23 inputs a fingerprint image stored in the fingerprint DB 3 to the skeleton extraction model (hereinafter, also referred to as a "trained model") trained by the model training unit 22, and acquires the fingerprint image, that is, a skeleton extraction result output by the trained model. Then, the evaluation value calculation unit 23 calculates a degree of similarity between the fingerprint image input to the trained model and the fingerprint image output by the trained model as the evaluation value. The evaluation value calculation unit 23 inputs a plurality of fingerprint images stored in the fingerprint DB 3 into the trained model, and calculates an evaluation value for each fingerprint image. Moreover, the evaluation value calculation unit 23 calculates an average of evaluation values obtained by inputting the plurality of fingerprint images into the trained model, and sets an average value of the evaluation values of the trained model.

The model update unit 24 updates the skeleton extraction model to be trained by the model training unit 22. Here, updating of a model refers to creating of training data based on a model of a previous generation and generating of the model of a next generation. Specifically, the model update unit 24 generates a next generation skeleton extraction model in a case where an average value of evaluation values of a trained model of a current generation is greater than an average value of evaluation values of a trained model before one generation, that is, in a case where it is considered that a performance of the skeleton extraction model is improved by learning. That is, the model update unit 24 updates the model while there is room for improving the performance of the skeleton extraction model by updating the model. Therefore, a model with high performance can be obtained by repeatedly updating the model. On the other hand, in a case where the average value of the evaluation values of the trained model of the current generation is equal to or less than the average value of the evaluation values of the trained model before one generation, that is, in a case where the improvement of the performance of the skeleton extraction model cannot be expected by updating the model, the model update unit 24 terminates the updating of the model and determines the trained model at an end of the updating as the final model.

The uncorrected image detection unit 25 detects the uncorrected image stored in the fingerprint DB 3 using the generated final model. Specifically, in a case where an evaluation value obtained by inputting a certain fingerprint image into the final model is equal to or less than a predetermined threshold value, the uncorrected image detection unit 25 determines that the fingerprint image is the corrected image.

Model Generation Method

Figure 4:
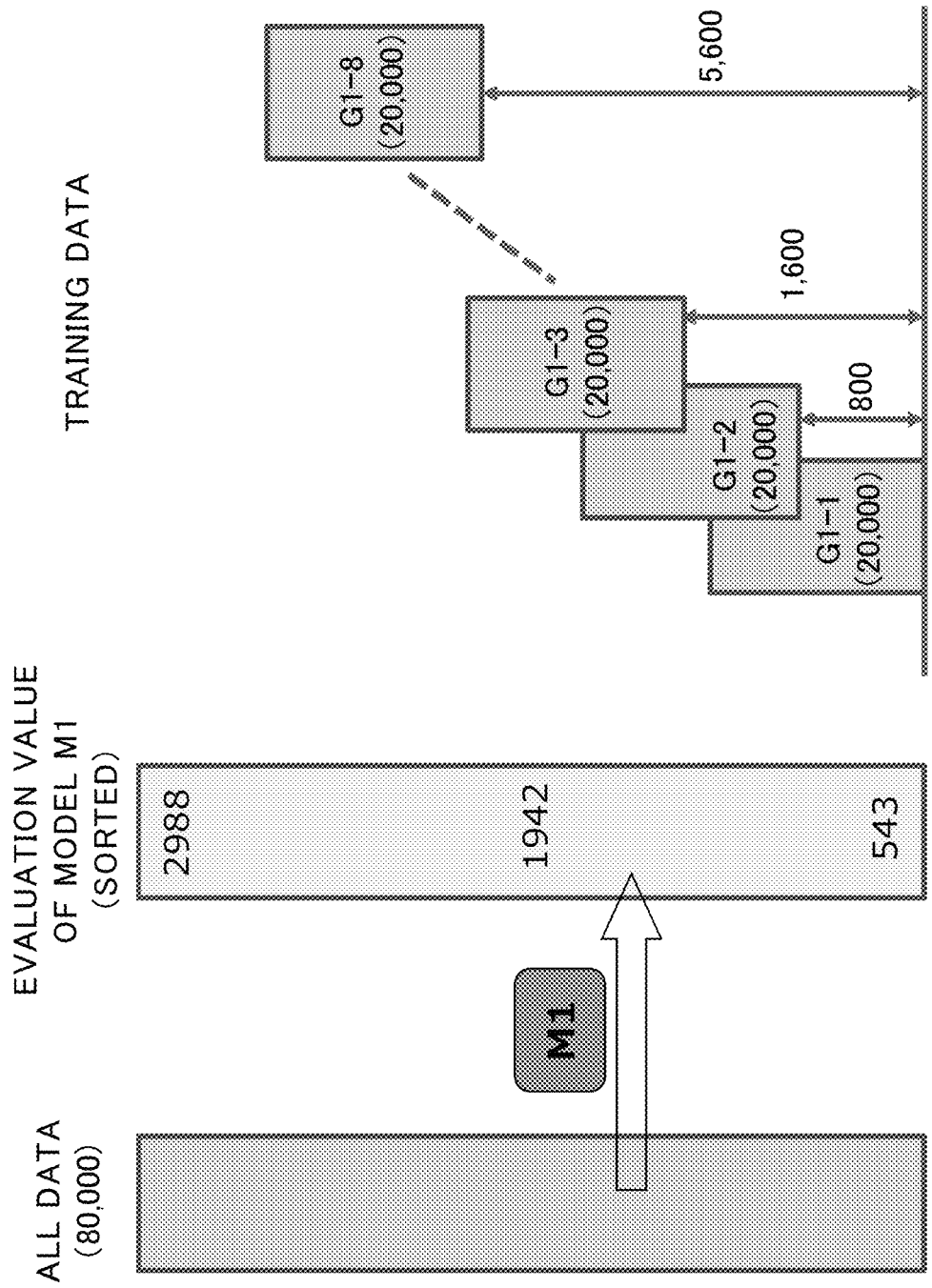
FIG. 4 illustrates a method for creating training data from an initial model of a first generation.

Next, a specific example of a method for generating the skeleton extraction model will be described. FIG. 4 illustrates the method for creating training data from an initial model M1 of a first generation. A total number of fingerprint images currently registered in the fingerprint DB 3 is assumed to be 80,000 images. First, the training data selection unit 21 selects 80,000 fingerprint images as the training data. The model training unit 22 trains the initial model M1 of the skeleton extraction model using the selected 80,000 fingerprint images as the training data, and generates a trained model M1. The evaluation value calculation unit 23 inputs 80,000 fingerprint images into the trained model M1, calculates an evaluation value indicating the degree of similarity between the input fingerprint image and the fingerprint image obtained as the skeleton extraction result by the trained model M1, and sorts the input fingerprint images in an order of higher evaluation values. In an example in FIG. 4, a maximum value of the evaluation value is assumed to be 3,000.

Next, the training data selection unit 21 selects the training data for training a model of a next generation from the 80,000 fingerprint images which have been sorted. Specifically, the training data selection unit 21 creates eight training data groups G1-1 through G1-8 each including 20,000 fingerprint images from the 80,000 fingerprint images sorted base on the evaluation values. At that time, the training data selection unit 21 creates the eight training data groups G1-1 through G1-8 by shifting a predetermined number (800 fingerprint images in this example) of fingerprint images having lower evaluation values from the sorted fingerprint images as illustrated.

Note that, a reason for selecting sets of the training data in the order of the lower evaluation values is as follows. Each fingerprint image, which is used for a model generation, is regarded as a somewhat complex image that requires a correction. That is to say, the performance of the skeleton extraction model is improved by carrying out the learning using images which need some degree of the correction. Each fingerprint image for which a higher evaluation value is obtained by the initial model M1 is considered to be an image that is not so complicated and has little learning effect. On the other hand, the fingerprint image with a lower evaluation value according to the initial model M1 is considered to be an image from which a learning effect can be expected. In such a viewpoint, the training data selection unit 21 basically selects data having the lower evaluation value as the training data. By this selection manner, it is possible to acquire a plurality of training data groups that can be expected to have the learning effect.

Figure 5:
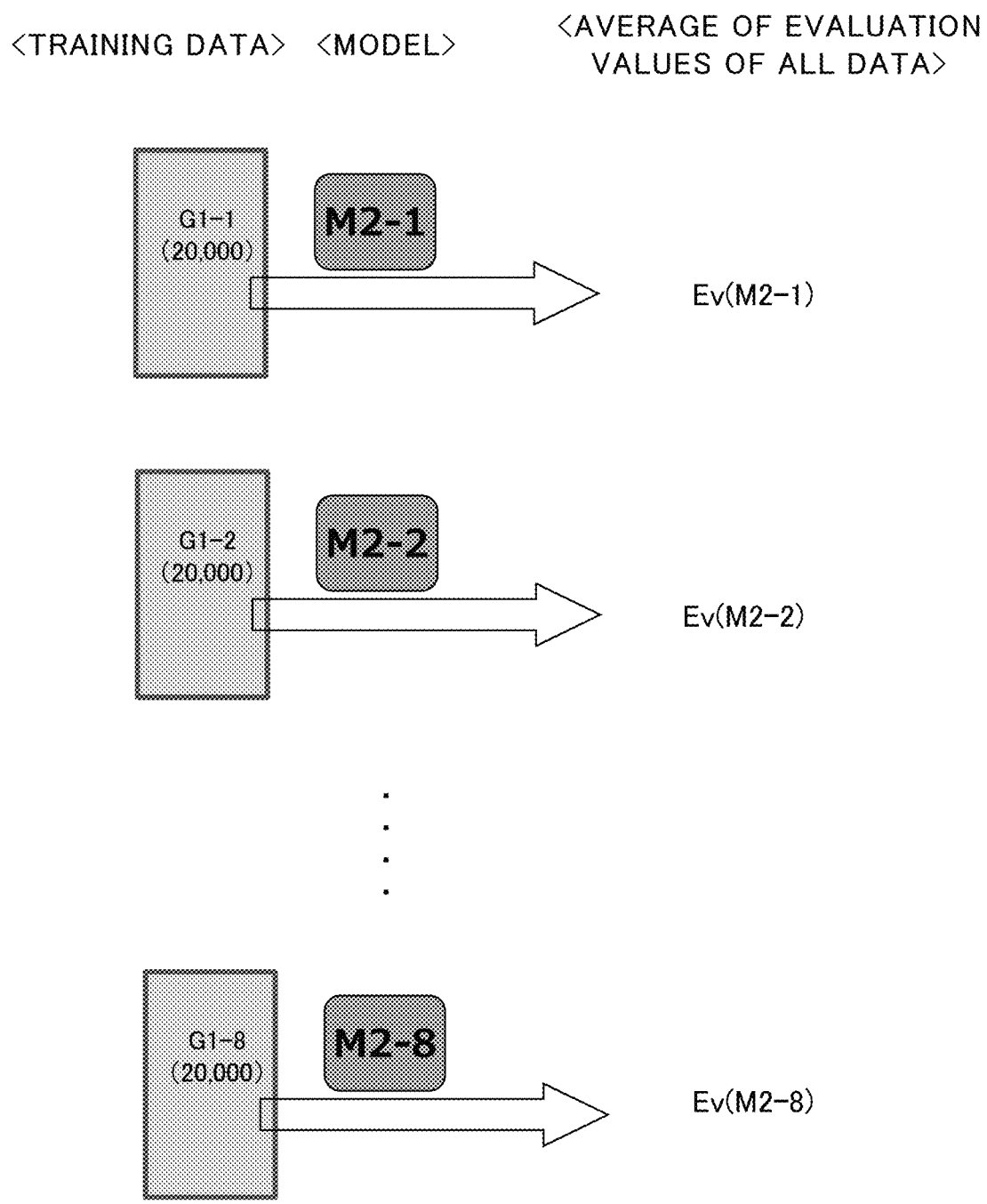
FIG. 5 illustrates a method for generating a representative model of a second generation.

Next, as illustrated in FIG. 5, the model update unit 24 prepares eight candidate models M2-1 through M2-8 of a second generation corresponding to eight training data groups, and the model training unit 22 trains these models by using sets of training data of the corresponding training data groups G1-1 through G1-8. By this training, the trained candidate models M2-1 through M2-8 of the second generation are generated. Next, the evaluation value calculation unit 23 calculates an evaluation value for each trained candidate model, and further calculates an average value of evaluation values. Specifically, the evaluation value calculation unit 23 inputs all data, that is, the 80,000 fingerprint images, into the trained candidate model M2-1, calculates an evaluation value for each of the fingerprint images, and further calculates an average value Ev(M2-1) of evaluation values. In the same manner, the evaluation value calculation unit 23 inputs all data into the trained candidate model M2-2, calculates an evaluation value for each fingerprint image, and further calculates an average value Ev(M2-2) of evaluation values. Accordingly, the evaluation value calculation unit 23 calculates evaluation values for all the training data groups G2-1 through G2-8, and calculates average values Ev(M2-1) through Ev(M2-8) of evaluation values. Next, among the trained candidate models M2-1 through M2-8, the model update unit 24 determines a model having the highest average value of the evaluation values as a model having the highest accuracy, to be a representative model M2 of the second generation. Hence, the representative model M2 of the second generation is generated from the initial model M1 of the first generation. Accordingly, among a plurality of candidate models, it is possible to use a model with the highest accuracy as a representative model for its generation.

Figure 6:
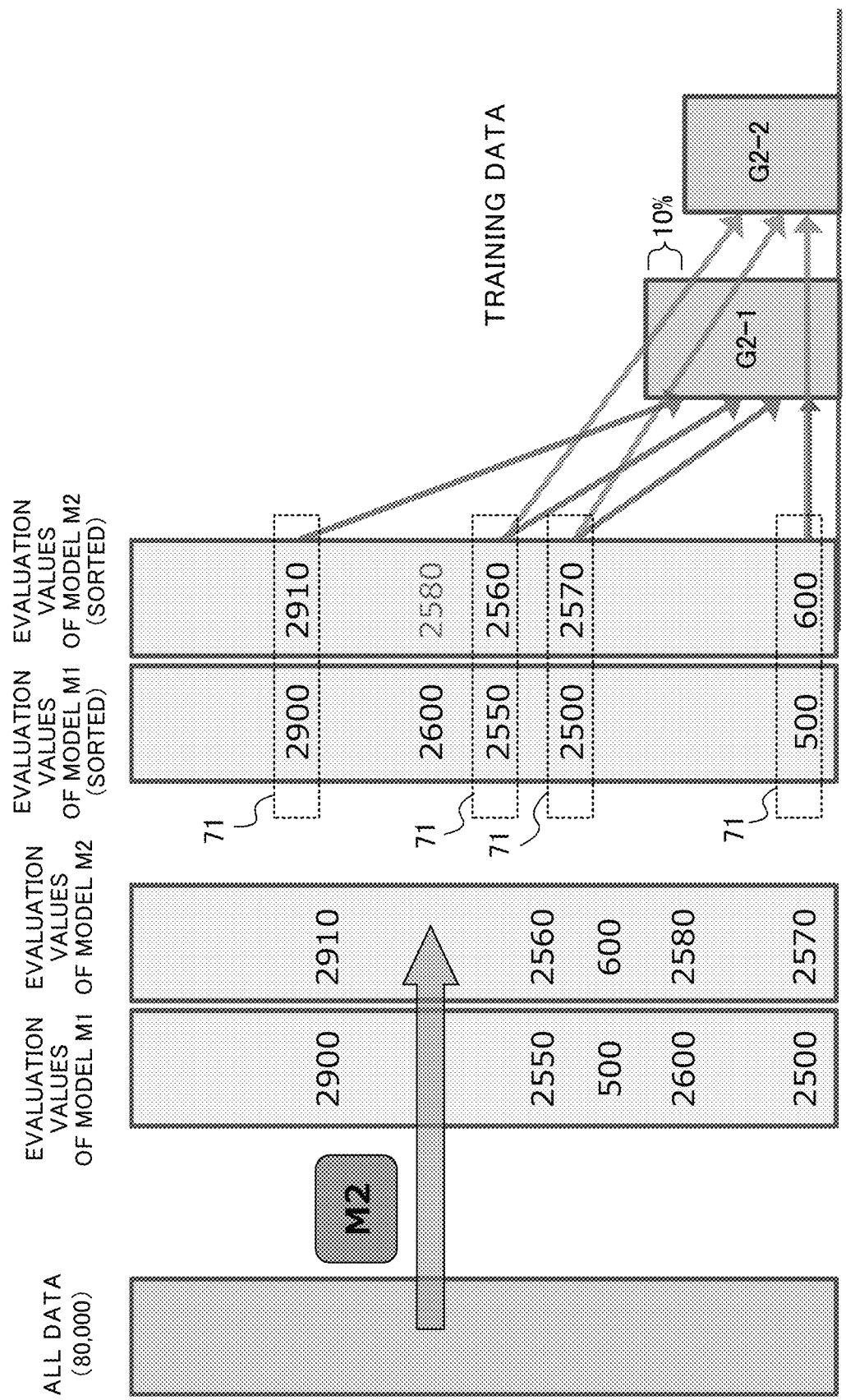
FIG. 6 illustrates a method for creating training data by using the representative model of the second generation.

Next, the representative model M2 of the second generation is used to create training data for the model generation of a third generation. FIG. 6 illustrates a method for creating the training data from the representative model M2 of the second generation. The evaluation value calculation unit 23 calculates an evaluation value of the representative model M2 using all data of the fingerprint images. Next, the evaluation value calculation unit 23 sorts evaluation values for the initial model M1 in a descending order, and sorts the evaluation values for the representative model M2 in the same order as that of the evaluation values for the initial model M1. The training data selection unit 21 compares the evaluation values for the model M1 sorted in the order of the higher evaluation values with the evaluation values for the model M2 sorted in accordance with the order of the evaluation values for the initial model M1, and generates two training data groups G2-1 and G2-2 by extracting each fingerprint image in which an evaluation value for the model M2 is higher than a corresponding evaluation value for the model M1 as indicated by each dashed line 71. Note that, in this example embodiment, the training data selection unit 21 removes fingerprint images having the evaluation values in the top 10% among the fingerprint images included in the training data group G2-1, and classifies the removed fingerprint images into the training data group G2-2. However, the training data group G2-2 may be created by another method as long as the fingerprint images, which evaluation values for the model M2 are higher than corresponding evaluation values for the model M1, are used.

Figure 7:
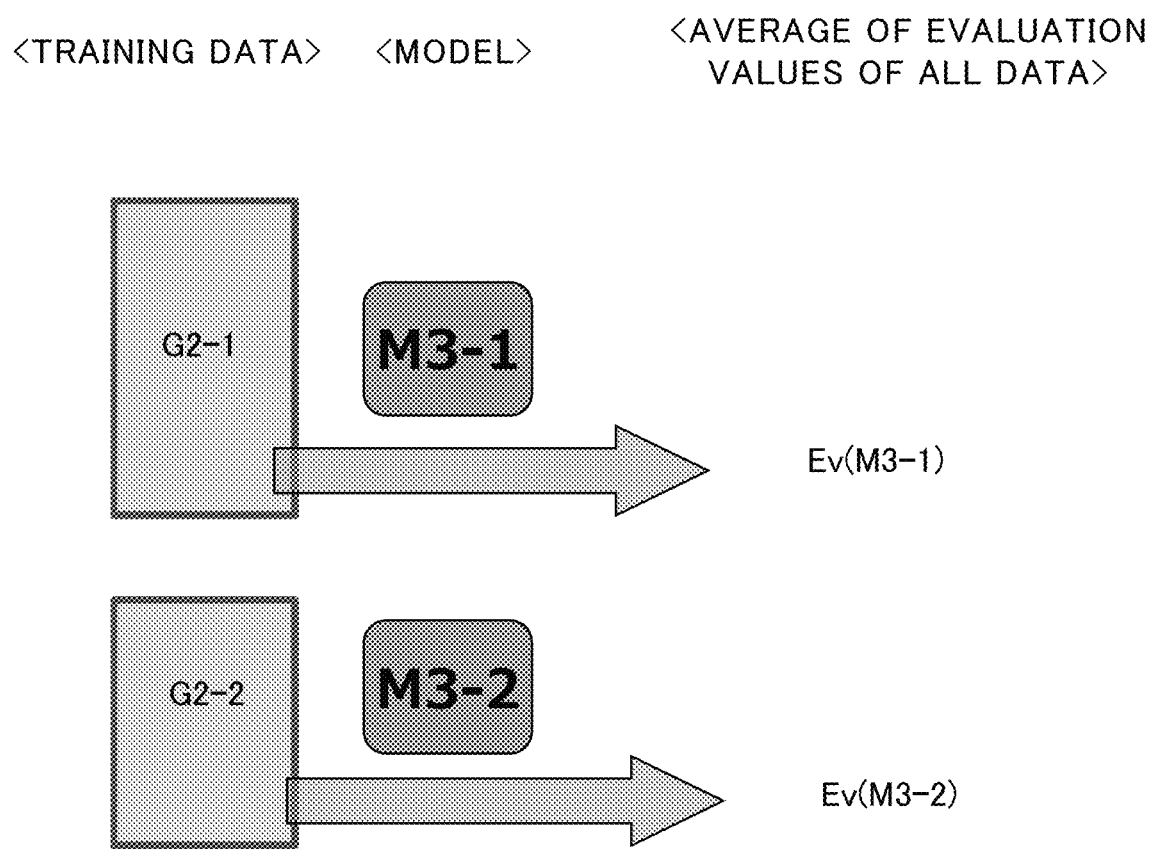
FIG. 7 illustrates a method for generating a representative model of a third generation.

Next, using the created training data groups G2-1 and G2-2, a third generation model is generated. FIG. 7 illustrates a method for generating a representative model for the third generation. The model training unit 22 trains candidate models M3-1 and M3-2 for the third generation by using the created training data groups G2-1 and G2-2, and generates the trained candidate models M3-1 and M3-2. Next, the evaluation value calculation unit 23 calculates an evaluation value for each trained candidate model, and calculates an average value of evaluation values. In detail, the evaluation value calculation unit 23 inputs all data of the 80,000 images into the trained candidate model M3-1, calculates an evaluation value for each fingerprint image, and further calculates an average value Ev(M3-1) of evaluation values. In the same manner, the evaluation value calculation unit 23 inputs all data into the trained candidate model M3-2, calculates an evaluation value for each fingerprint image, and further calculates an average value Ev(M3-2) of the evaluation values. The model update unit 24 determines a model having a larger average value of the evaluation values from the trained candidate models M3-1 and M3-2 as a model having higher accuracy to be a representative model M3 of the third generation. Accordingly, the representative model M3 of the third generation is generated.

Figure 8:
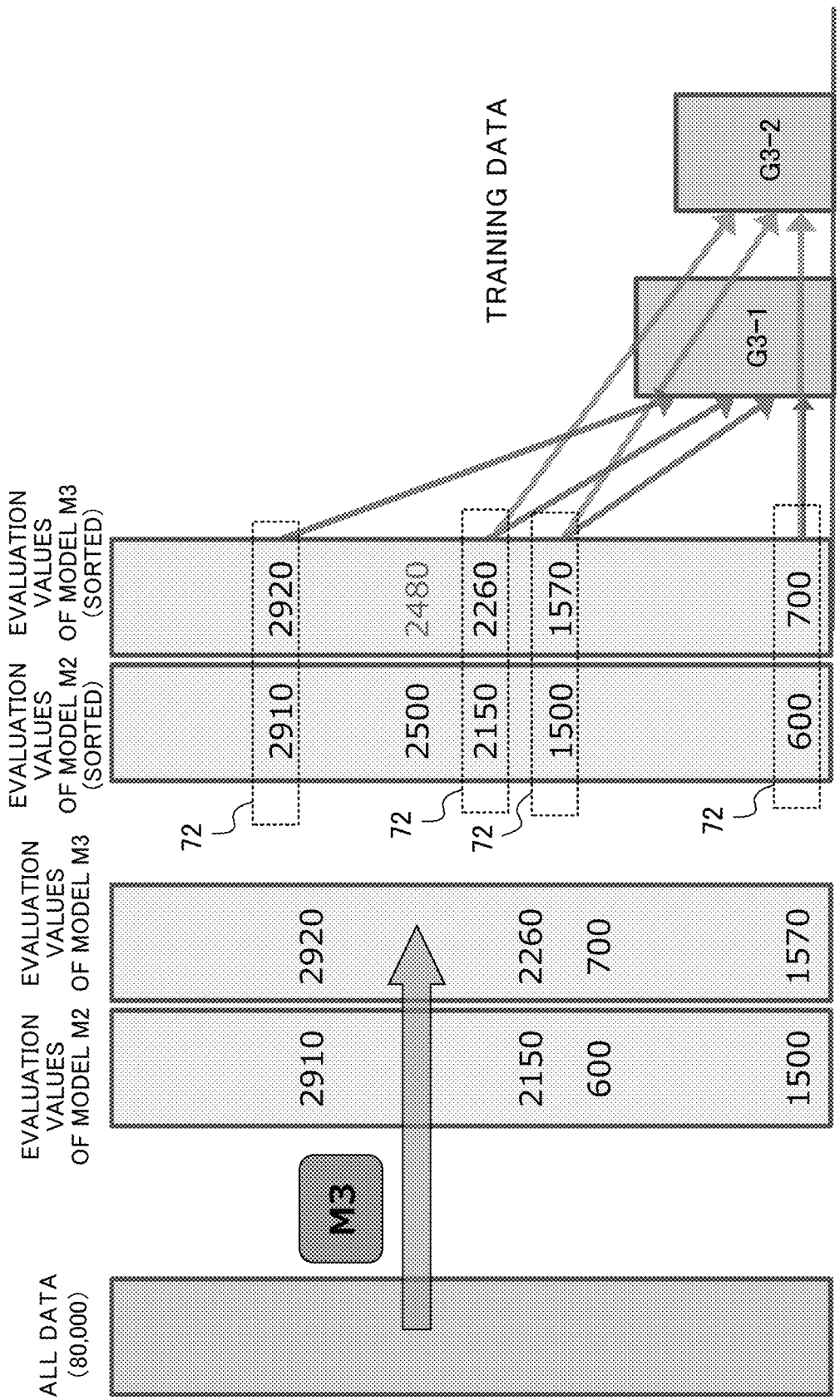
FIG. 8 illustrates a method for creating training data by using the representative model of the third generation.

Next, training data are created for the model generation of a fourth generation. FIG. 8 illustrates a method for creating the training data from the representative model M3 of the third generation. The model update unit 24 compares the average value of the evaluation values of the representative model M2 for the second generation with the average value of the evaluation values of the representative model M3 for the third generation. In a case where the average value of the evaluation values for the representative model M3 is greater than the average value of the evaluation values for the representative model M2, the performance of the third generation model is higher than that of the second generation model, and it is considered that there is a possibility of further performance improvement. Hence, the training data selection unit 21 creates the training data for the fourth generation model. Accordingly, the model is updated only in a case where it may be possible to improve the performance of the model.

Specifically, the evaluation value calculation unit 23 calculates evaluation values for the representative model M3 using all data of the fingerprint images. The training data selection unit 21 compares the evaluation values for the model M2 sorted in the order of the higher evaluation values with corresponding evaluation values for the model M3 sorted in accordance with the order of the evaluation values for the model M2, and creates two training data groups G3-1 and G3-2, as illustrated in the dashed line 72 by extracting each fingerprint image which evaluation value for the model M3 is increased from the corresponding evaluation value for the model M2. Note that in the present example embodiment, fingerprint images which evaluation values are in the top 10% are removed from the fingerprint images included in the training data group G3-1 and are classified into the training data group G3-2. The model training unit 22 generates a model of the fourth generation using the created training data groups G3-1 and G3-2.

Accordingly, in the third generation or later, in a case where the average value of the evaluation values for the representative model of the new generation is greater than the average value of the evaluation values of the representative model before one generation, a next generation model is generated by predicting that there is still room for performance improvement. On the other hand, when the average value of the evaluation values for the representative model of the new generation is not greater than the average value of the evaluation values for the representative model before one generation, it is predicted that there is no room for the performance improvement, and generating of the model of the next generation, that is, updating of the model is terminated. This process prevents the performance of the model from being degraded by repeatedly updating the model.

Method for Detecting an Uncorrected Image

Next, a method for detecting an uncorrected image will be described. The uncorrected image is a fingerprint image registered in the fingerprint DB 3 without being corrected by the forensic examiner or the like for some reason. Since the skeleton extraction model is trained using fingerprint images being corrected as the training data by the forensic examiner or the like, in a case where each uncorrected image is input to the trained skeleton extraction model, a difference between the input uncorrected image and a fingerprint image output by the skeleton extraction model is great and the evaluation value becomes small. On the other hand, in a case where the corrected fingerprint image is input to the trained skeleton extraction model, the difference between the input corrected fingerprint image and the fingerprint image output by the skeleton extraction model is small and the evaluation value becomes great. Therefore, theoretically, in a case where the fingerprint images registered in the fingerprint DB 3 are input to the trained skeleton extraction model, the corrected image can be detected based on the acquired evaluation value.

However, even if the fingerprint image is corrected, in a case of a complex fingerprint image, the evaluation value may become greater when the complex fingerprint image is inputted into the skeleton extraction model. This is because the performance of the skeleton extraction model has not been able to correspond to the complex fingerprint image. As a result, both the uncorrected image and a fingerprint image which has been corrected but complicated have smaller evaluation values in a case where these images are input to the skeleton extraction model, so that these images cannot be distinguished from each other.

Therefore, the above-described model generation process is executed to detect the uncorrected image by using the skeleton extraction model which performance is sufficiently improved, that is, by using a final model. In detail, the uncorrected image detection unit 25 inputs each fingerprint image in the fingerprint DB 3 into the final model, and determines the fingerprint image of which an evaluation value by the final model is smaller than a predetermined threshold value, as the corrected image. The final model outputs a fingerprint image close to the corrected complex fingerprint image in response to inputting the corrected complex fingerprint, so the evaluation value becomes greater. On the other hand, in a case where the uncorrected image is input, since the final model corrects many portions of the uncorrected image, a difference between a fingerprint image to be output and the uncorrected image becomes greater, and the evaluation value becomes smaller. Therefore, the uncorrected image detection unit 25 determines the fingerprint image having a low evaluation value by the final model as the uncorrected image. Accordingly, it is possible to detect the uncorrected image with high accuracy.

Model Generation Process

Figure 9:
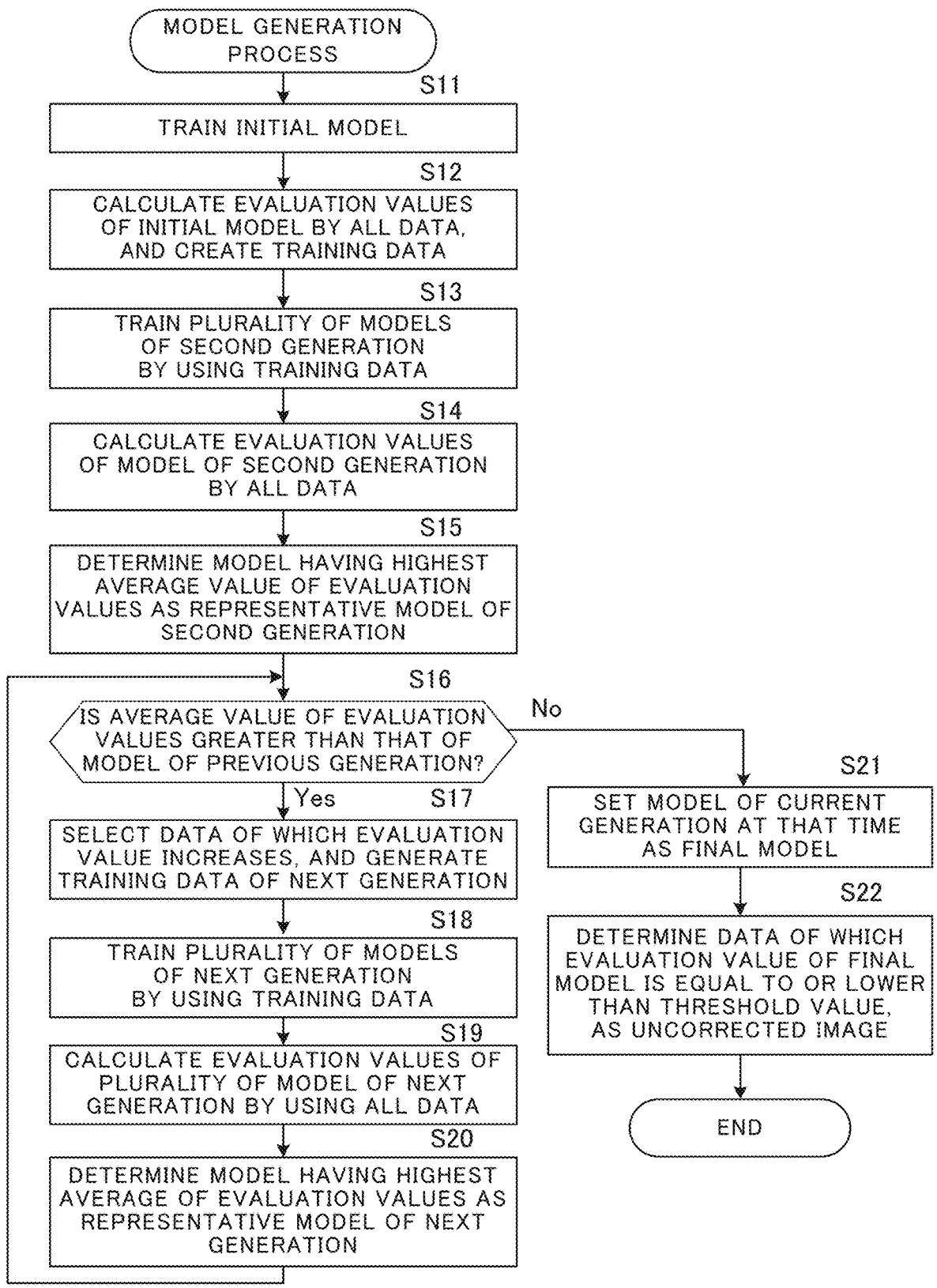
FIG. 9 is a flowchart of a model generation process.

Next, a model generation process executed by the model generation apparatus 100 will be described. FIG. 9 is a flowchart of the model generation process. This process is realized by the processor 12 illustrated in FIG. 2, which executes a program prepared in advance and operates as each element depicted in FIG. 3.

First, training of an initial model is performed (step S11). Specifically, the training data selection unit 21 acquires fingerprint images from the fingerprint DB 3, and the model training unit 22 trains the initial model M1 using the acquired fingerprint images as the training data. Next, the evaluation value calculation unit 23 calculates each of evaluation values for the initial model M1 using all data, and creates the training data (step S12). Specifically, as illustrated in FIG. 4, the evaluation value calculation unit 23 calculates evaluation values of the trained initial model M1 using all data, and sorts the evaluation values in an order of higher evaluation values. After that, the evaluation value calculation unit 23 creates a predetermined number of the training data groups G1-1 through G1-8 from lower evaluation values.

Next, training of a plurality of models of the second generation is performed using sets of the created training data (step S13). FIG. 5 illustrates the plurality of models of the second generation. Specifically, the model update unit 24 sets the eight candidate models M2-1 through M2-8 of the second generation illustrated in FIG. 5 to the model training unit 22. The model training unit 22 trains the candidate models M2-1 through M2-8 using the training data groups G1-1 through G1-8, and generates the trained candidate models M2-1 through M2-8.

Next, the evaluation value calculation unit 23 calculates the evaluation value of the plurality of models of the second generation (step S14). In detail, the evaluation value calculation unit 23 calculates the evaluation value of eight candidate models M2-1 through M2-8 of the second generation using all data. Next, the model update unit 24 determines a model having a highest average value of the evaluation values among the plurality of candidate models of the second generations, as the representative model M2 of the second generation (step S15). Specifically, the model update unit 24 determines a model having a highest average value of evaluation values among the eight candidate models M2-1 through M2-8 of the second generation, as the representative model M2 of the second generation.

Next, the model update unit 24 determines whether or not the average value of the evaluation values of the models of a current generation is greater than an average value of evaluation values of models of all generations (step S16). In detail, the model update unit 24 determines whether or not the average value of the evaluation values of the representative model M2 of the second generation is greater than the average value of the evaluation values of the initial model M1 of the first generation. When the average value of the evaluation values of the model of the current generation is greater than that of the initial model M1 (step S16: Yes), the training data selection unit 21 selects data of which evaluation value has increased from a model of a previous generation as illustrated by the dashed lines 71 in FIG. 6, and creates training data of a next generation (step S17). Specifically, as illustrated in FIG. 6, the training data selection unit 21 extracts data having the evaluation value of the model M2 greater than the evaluation value of the model M1, and creates the training data groups G2-1 and G2-2.

Next, a plurality of models of a next generation are trained using sets of the created training data (step S18). In detail, the model update unit 24 sets the candidate models M3-1 and M3-2 of the third generation depicted in FIG. 7 to the model training unit 22. The model training unit 22 trains the candidate models M3-1 and M3-2 using the training data groups G2-1 and G2-2 and generates the trained candidate models M3-1 and M3-2.

Next, the evaluation value calculation unit 23 calculates the evaluation value of the next generation model by all data (step S19). In detail, the evaluation value calculation unit 23 calculates evaluation values of the candidate models M3-1 and M3-2 of the third generation using all data. Next, the model update unit 24 determines, among the plurality of next generation models, a model for which the average value of the evaluation values is the greatest as the representative model of the next generation (step S20). Specifically, the model update unit 24 determines, among the candidate models M3-1 and M3-2 of the third generation, a model for which the average value of the evaluation values is the greatest, as the representative model M3 of the third generation. After that, the model generation process goes back to step S16.

Hence, in step S16, while it is determined that the average value of the evaluation values of the model of the current generation is greatest than the average value of the evaluation values of the model of the previous generation, that is, while the performance of the model is improved, generating of a model of a next generation using data of which the evaluation values are increased as the training data, that is, updating of the model is repeated. On the other hand, when it is determined in step S16 that the average value of the evaluation values of the model of the current generation is not greater than the average value of the evaluation values of the model of the previous generation, it is considered that the improvement of the performance of the model is substantially saturated, so that the model update unit 24 terminates the updating of the model, and determines the current generation model at that time to the final model (step S21).

Next, the uncorrected image detection unit 25 calculates each evaluation value by inputting all data into the final model, and determines each set of data which evaluation value is equal to or less than a predetermined threshold value as the uncorrected image (step S22) After that, the model generation process is terminated.

MODIFICATION

Modification 1

In the above example, the eight training data groups G1-1 through G1-8 are created for a model learning of the second generation based on the evaluation values of the initial model M1 of the first generation, but the number of training data groups is not limited to this number of groups. In the same manner, in the above example, two training data groups are created for the model learning after the third generation; however, three or more training data groups may be created.

Modification 2

In the above example, the uncorrected image detection unit 25 determines data in which an evaluation value of the final model is equal to or less than the predetermined threshold value as the uncorrected image; however, the determination method of the uncorrected image is not limited thereto. For instance, the uncorrected image detection unit 25 may calculate the evaluation value of the final model using all data and the evaluation value of the model before one or several generations from the final model, and determine the data in which the evaluation value of the final model is lower than the evaluation value of the model of the previous generation as the uncorrected image.

Modification 3

In the above-described model generation process, the model update unit 24 terminates the updating of the model when the average value of the evaluation values for the model of the current generation is not greater than the average value of the evaluation values of the models for all generations. Alternatively, an update count of the model may terminate the updating of the model when the update count reaches a predetermined update count. By using the update count, it is possible to prevent the performance of the model from being degraded by repeatedly updating of the model more than necessary.

Modification 4

The display device 17 may display the model generation process illustrated in FIG. 4 to FIG. 8 and the like. Moreover, the display device 17 may display at least a portion of a fingerprint image employed as the training data, or may display a fingerprint image in which the uncorrected image detection unit 25 determines the fingerprint image as the uncorrected image, to the user.

Second Example Embodiment

Figure 10:
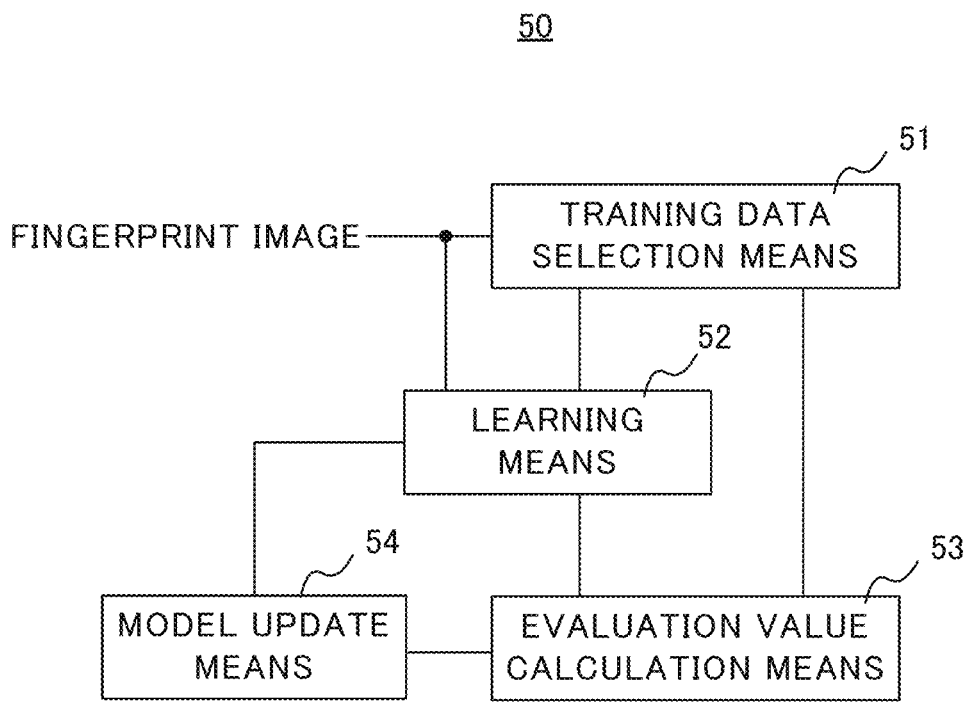
FIG. 10 illustrates a functional configuration of a model generation apparatus according to a second example embodiment.

FIG. 10 is a block diagram illustrating a functional configuration of a model generation apparatus 50 according to a second example embodiment. The model generation apparatus 50 includes a training data selection means 51, a learning means 52, an evaluation value calculation means 53, and a model update means 54. The training data selection means 51 selects sets of training data from a plurality of fingerprint images. The learning means 52 performs training of a model for correcting a fingerprint image using the sets of training data. The evaluation value calculation unit 53 calculates evaluation values of results obtained by inputting a plurality of fingerprint images into the trained model. The model update unit 54 updates the model to be trained based on the evaluation values. After that, the training data selection means 51 determines sets of training data to be selected from a plurality of fingerprint images based on the evaluation values.

Third Example Embodiment

Figure 11:
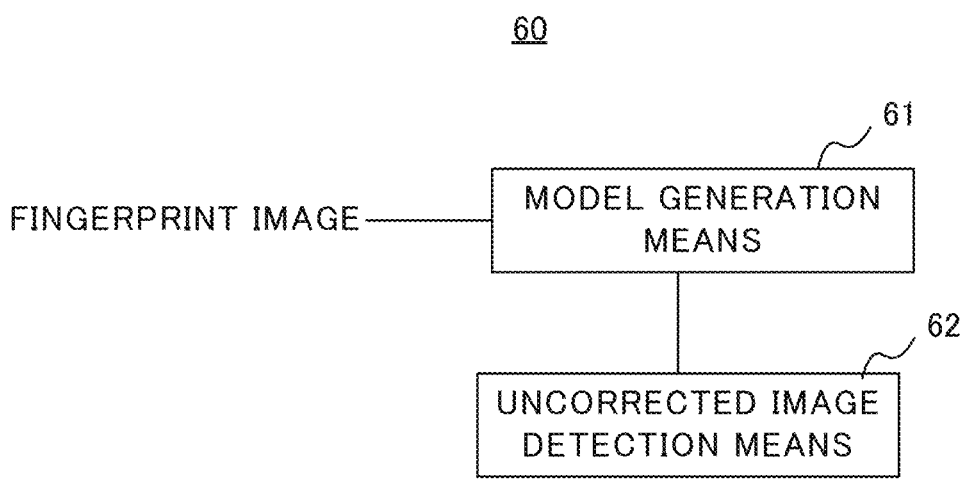
FIG. 11 illustrates a functional configuration of a model generation apparatus according to a third example embodiment.

FIG. 11 is a block diagram illustrating a functional configuration of an image processing apparatus 60 according to a third example embodiment. The image processing apparatus includes a model generation means 61 and an uncorrected image detection means 62. The model generation means 61 selects sets of training data from a plurality of fingerprint images including the corrected image, generates a model for correcting the fingerprint image using sets of the selected training data, and generates a final model by repeating a process for selecting sets of the training data for a next model using the generated model. The uncorrected image detection means 62 detects the corrected image included in the plurality of fingerprint images using the evaluation value of the result obtained from the final model.

A part or all of the example embodiments described above may also be described as the following supplementary notes, but not limited thereto.

Supplementary Note 1

1. A model generation apparatus comprising:
a training data selection means configured to select sets of training data from a plurality of fingerprint images;
a learning means configured to train a model that corrects a fingerprint image, by using the sets of training data;
an evaluation value calculation means configured to calculate evaluation values of results acquired by inputting the plurality of fingerprint images to the model which has been trained; and
a model update means configured to update the model to be trained based on the evaluation values,
wherein the training data selection means determines the sets of training data to be selected from the plurality of fingerprint images, based on the evaluation values.

Supplementary Note 2

2. The model generation apparatus according to supplementary note 1, wherein the training data selection means selects, as the training data, each fingerprint image which has a higher evaluation value in results acquired from a post-update model than a corresponding evaluation value in results acquired from a pre-update mode, from among the plurality of fingerprint images.

Supplementary Note 3

3. The model generation apparatus according to supplementary note 1, wherein the training data selection means sorts the plurality of fingerprint images in an order of higher evaluation values of results, which are acquired by inputting the plurality of fingerprint images into an initial model at a time of selecting of first sets of training data, and shifts the sorted fingerprint images by a predetermined number of fingerprint images from lower evaluation values, so as to generate a plurality of sets of training data groups each including the same number of fingerprint images.

Supplementary Note 4

4. The model generation apparatus according to supplementary note 1, wherein the training data selection means
generates a plurality of training data groups by using the selected sets of training data at a time of selecting of training data after a second time; and
training the model for each of the plurality of training data groups,
wherein the model update means updates the model to be trained with a model having a highest average value of evaluation values of results being output, from among models trained for respective training data groups.

Supplementary Note 5

5. The model generation apparatus according to any one of supplementary notes 1 through 4, wherein the model update means updates the model to be trained when an average value of evaluation values of the results acquired from the post-update model is greater than an average value of evaluation values of results acquired from a pre-update model.

Supplementary Note 6

6. The model generation apparatus according to supplementary note 5, wherein the model update means terminates updating of the model when the average value of the evaluation values of the results acquired from the post-update model is greater than the average value of the evaluation values of results acquired from the pre-update model, and determines a latest model at that time as a final model.

Supplementary Note 7

7. The model generation apparatus according to supplementary note 5, wherein the model update means terminates updating of the model when the model to be trained is updated a predetermined number of times, and determines a latest model as a final model.

Supplementary Note 8

8. The model generation apparatus according to supplementary note 6 or 7, further comprising an uncorrected image detection means configured to detect an uncorrected image included in the plurality of fingerprint images by using the evaluation values of the results of the final model.

Supplementary Note 9

9. A model generation method comprising:
selecting sets of training data from a plurality of fingerprint images;
training a model that corrects a fingerprint image, by using the sets of training data;
calculating evaluation values of results acquired by inputting the plurality of fingerprint images to the model which has been trained; and
updating a model to be trained based on the evaluation values,
wherein sets of training data to be selected from the plurality of fingerprint images are determined based on the evaluation values.

Supplementary Note 10

10. A recording medium storing a program, the program causing a computer to perform a process comprising:
selecting sets of training data from a plurality of fingerprint images;
training a model that corrects a fingerprint image, by using the sets of training data;
calculating evaluation values of results acquired by inputting the plurality of fingerprint images to the model which has been trained; and
updating the model to be trained based on the evaluation values,
wherein the sets of training data to be selected from the plurality of fingerprint images are determined based on the evaluation values.

Supplementary Note 11

11. An image processing apparatus comprising:
a model generation means configured to select sets of training data from a plurality of fingerprint images including an uncorrected image, generate a model that corrects a fingerprint image by the selected sets of training data, and generate a final model by repeating a process for selecting sets of training data for a next model by using the generated model; and
an uncorrected image detection means configured to detect the uncorrected image included in the plurality of fingerprint images by using evaluation values of results acquired from the final model.

Supplementary Note 12

12. An image processing method comprising:
selecting sets of training data from a plurality of fingerprint images including an uncorrected image, generating a model that corrects a fingerprint image by the selected sets of training data, and generating a final model by repeating a process for selecting sets of training data for a next model by using the generated model; and
detecting the uncorrected image included in the plurality of fingerprint images by using evaluation values of results acquired from the final model.

Supplementary Note 13

13. A recording medium storing a program, the program causing a computer to perform a process comprising:
selecting sets of training data from a plurality of fingerprint images including an uncorrected image, generating a model that corrects a fingerprint image by the selected sets of training data, and generating a final model by repeating a process for selecting sets of training data for a next model by using the generated model; and
detecting the uncorrected image included in the plurality of fingerprint images by using evaluation values of results acquired from the final model.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

3 Fingerprint database (DB)
11 Input IF
12 Processor
13 Memory
14 Recording medium
15 Database
16 Input device
17 Display device
21 Training data selection unit
22 Model training unit
23 Evaluation value calculation unit
24 Model update unit
25 Uncorrected image detection unit
50 Model generation apparatus
51 Training data selection unit
52 Learning means
53 Evaluation value calculation means
54 Model update means
60 Image processing apparatus
61 Model generation means
62 Uncorrected image detection means
100 Model generation apparatus

What is claimed is:

1. A model generation apparatus comprising:
a memory storing instructions; and
one or more processors configured to execute the instructions to:
select sets of training data from a plurality of fingerprint images;
train a model that corrects a fingerprint image, by using the sets of training data;
calculate evaluation values of results acquired by inputting the plurality of fingerprint images to the model which has been trained; and
update the model to be trained based on the evaluation values,
wherein the processor:
determines the sets of training data to be selected from the plurality of fingerprint images, based on the evaluation values;
sorts the plurality of fingerprint images in an order of higher evaluation values of results, which are acquired by inputting the plurality of fingerprint images into an initial model at a time of selecting of first sets of training data; and
shifts the sorted fingerprint images by a predetermined number of fingerprint images from lower evaluation values, so as to generate a plurality of sets of training data groups each including the same number of fingerprint images.

2. The model generation apparatus according to claim 1, wherein the processor
generates a plurality of training data groups by using the selected sets of training data at a time of selecting of training data after a second time; and
training the model for each of the plurality of training data groups,
wherein the processor updates the model to be trained with a model having a highest average value of evaluation values of results being output, from among models trained for respective training data groups.

3. The model generation apparatus according to claim 1, wherein the processor updates the model to be trained when an average value of evaluation values of the results acquired from the post-update model is greater than an average value of evaluation values of results acquired from a pre-update model.

4. The model generation apparatus according to claim 3, wherein the processor terminates updating of the model when the average value of the evaluation values of the results acquired from the post-update model is greater than the average value of the evaluation values of results acquired from the pre-update model, and determines a latest model at that time as a final model.

5. The model generation apparatus according to claim 3, wherein the processor terminates updating of the model when the model to be trained is updated a predetermined number of times, and determines a latest model as a final model.

6. The model generation apparatus according to claim 4, wherein the processor is further configured to detect an uncorrected image included in the plurality of fingerprint images by using the evaluation values of the results of the final model.

7. A model generation method performed by a computer and comprising:
   selecting sets of training data from a plurality of fingerprint images;
   training a model that corrects a fingerprint image, by using the sets of training data;
   calculating evaluation values of results acquired by inputting the plurality of fingerprint images to the model which has been trained; and
   updating the model to be trained based on the evaluation values,
   wherein the model generation method:
      determines the sets of training data to be selected from the plurality of fingerprint images, based on the evaluation values;
      sorts the plurality of fingerprint images in an order of higher evaluation values of results, which are acquired by inputting the plurality of fingerprint images into an initial model at a time of selecting of first sets of training data; and
      shifts the sorted fingerprint images by a predetermined number of fingerprint images from lower evaluation values, so as to generate a plurality of sets of training data groups each including the same number of fingerprint images.

8. A non-transitory computer-readable recording medium storing a program executable by a computer to perform a process comprising:
   selecting sets of training data from a plurality of fingerprint images;
   training a model that corrects a fingerprint image, by using the sets of training data;
   calculating evaluation values of results acquired by inputting the plurality of fingerprint images to the model which has been trained; and
   updating the model to be trained based on the evaluation values,
   wherein the process:
      determines the sets of training data to be selected from the plurality of fingerprint images, based on the evaluation values;
      sorts the plurality of fingerprint images in an order of higher evaluation values of results, which are acquired by inputting the plurality of fingerprint images into an initial model at a time of selecting of first sets of training data; and
      shifts the sorted fingerprint images by a predetermined number of fingerprint images from lower evaluation values, so as to generate a plurality of sets of training data groups each including the same number of fingerprint images.

* * * * *